J. H. Thomas,
Grain Drill.
No. 112,299.  Patented Feb. 28, 1871.
2 Sheets, Sheet 1.
Fig. 1.
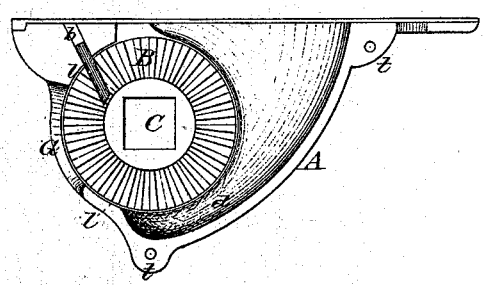
Fig. 3.
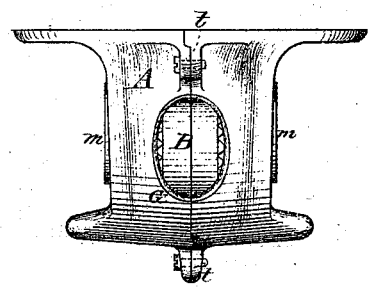
Fig. 2.
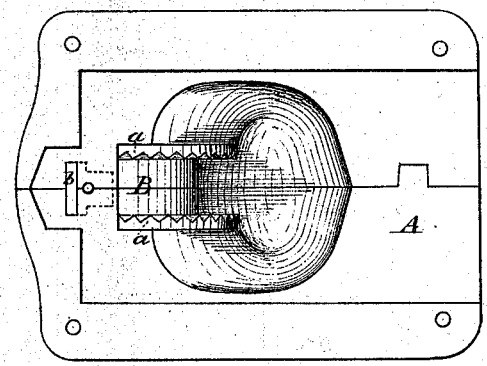
Fig. 5.   Fig. 6.   Fig. 7.
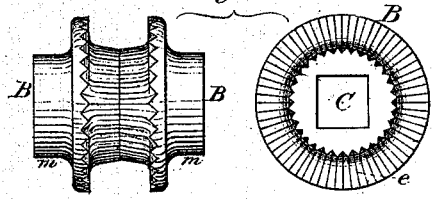   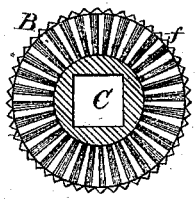   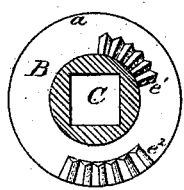
Witnesses:
T. C. Brecht.
Phil. T. Dodge
Inventor:
John H. Thomas
by Dodge & Munn
Attys.

J. H. Thomas,
Grain Drill.
No. 112,299. Patented Feb. 28, 1871.
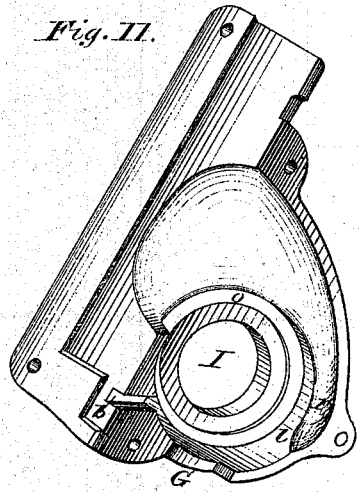
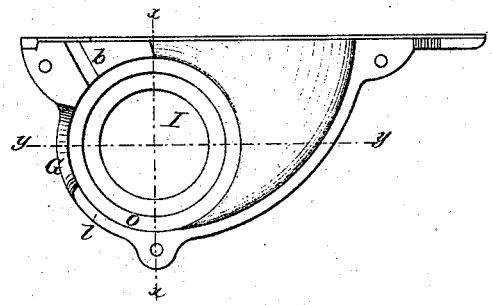
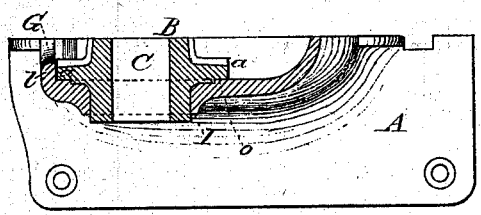
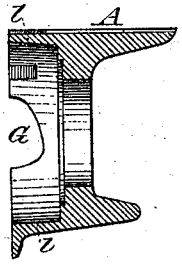
Witnesses:
J. C. Brecht
Phil. T. Dodge
Inventor:
John H. Thomas,
by Dodge & Munn
Attys

United States Patent Office.

JOHN H. THOMAS, OF SPRINGFIELD, OHIO, ASSIGNOR TO HIMSELF AND PHINEAS P. MAST, OF SAME PLACE.

Letters Patent No. 112,299, dated February 28, 1871.

IMPROVEMENT IN GRAIN-DRILLS.

The Schedule referred to in these Letters Patent and making part of the same.

*To all whom it may concern:*

Be it known that I, JOHN H. THOMAS, of Springfield, in the county of Clark and State of Ohio, have invented certain Improvements in Grain-Drills, of which the following is a specification, reference being had to the accompanying drawing.

My invention relates to that class of grain-drills or seeding-machines in which wheels or rollers are used in seed-cups attached to the under side of the hopper for feeding out the grain; and The invention consists in an improvement in the construction of the feed-wheels and their cups, as hereinafter explained.

Figure 1 is a longitudinal vertical section of the seed-cup and wheel;

Figure 2 is a top plan view of a cup and wheel complete;

Figure 3 is a rear end view of a cup and wheel turned on its side;

Figures 5, 6, and 7 are views of the feed-wheels detached, and shown in section;

Figures 8, 9, and 10 are sectional views of the case; and

Figure 11 is a perspective view of one-half of the cup or case, showing the form of its interior.

The general style of my improved cup and wheel is similar to that heretofore patented to Thomas and Mast.

My present device, however, varies from the former in several important particulars, which I will proceed to describe.

In the former machines the feed-wheels (which in this case are represented by the letter B) were made with their periphery convex, their greatest diameter being through their center vertically, they being gradually rounded off from the center toward their hub or journal on each side. My present wheel I make the reverse of this, it being concave on its periphery, or, in other words, it is made in the form of a pulley or sheave, as represented in fig. 5, which shows one of the wheels cut vertically through its center, that is, through the middle of the groove in its periphery. When thus made, it will be perceived that each half of the wheel has on its outer end a hub or journal, $m$, between which and the groove is a radial flange, $a$; and through the center of the wheel lengthwise there is made a square or rectangular hole, C, for securing it on the shaft in the usual manner.

The inner faces of the flanges $a$ I provide with a series of uniform ribs, $e$, as shown in figs. 5, 6, and 7.

In fig. 5 these ribs, with their intervening grooves, are represented as extending from the extremity of the flange $a$ down along its inner face, and also across the bottom of the main groove or convex portion of the wheel B, thus forming a continuous series of ribs extending at right angles entirely across the concave portion of the wheel between the flanges $a$ and out to the extremity of said flanges, the object of these ribs being to feed the grain out through the opening G in the rear ends of the cups A.

For sowing the different kinds of grain different forms of ribs are required, or, at least, are found to work to advantage; and, as these machines are intended to sow all kinds of small grains, I vary the style of the concavity, and of the ribs therein, to suit the different kinds of grain. As represented in fig. 4, the concavity or groove in the wheel may be made rectangular in cross-section, the inner faces of the flanges $a$ being straight or vertical from their extremity down to the body of the wheel, as there represented; and I propose, also, in some cases, to make the ribs $e$ on the face of the flanges only, thus leaving the central portion of the wheel, from one flange to the other, smooth or free from ribs.

For sowing some kinds of grain, such as corn, beans, and peas, for which purpose these machines are also intended, the ribs $e$ should be made coarser or larger; and I also propose to make them as represented in fig. 7, where they are represented, at $e'$ as, extending from the center or body outward about one-half of the width of the flange $a$; and at $e^2$, where they are shown as being arranged around the outer portion of the flange, and extending from their outer edge inward about one-half of the width of the flange.

I also make these wheels with ribs, $f$, on the periphery of the flanges $a$, as represented in fig. 6.

The cup or case in which these feed-wheels B are used is made in the general form outwardly, shown in the former patents, and as here shown in figs. 1, 2, and 3, it being cast in two parts, united on a vertical line passing through the center' longitudinally, and being secured together by small screws passing through corresponding projections, $t$, as represented.

The cavity within these cups or cases is volute in its general form, from front to rear, as represented in figs. 1, 9, 10, and 11. At its front and upper side this cavity is made of a nearly circular form, as shown in fig. 2; and from thence gradually decreases in size, its sides or walls converging until its width is just sufficient to inclose the wheel B with its flanges $a$, as shown in figs. 2 and 9, the latter representing but half a cup and wheel, with the bottom cut away on the line $y\ y$ of fig. 10.

The cups are made with a hole, I, in each side, to form a bearing for the journals $m$ of the wheels; and around these holes, on the inner faces of the sides of the cup, there is made a flat or smooth surface, $o$, which extends outward even with the periphery of the flanges $a$ when the wheel is inserted. The holes I are located near the rear end of the cup A, so that the wheel B, when inserted, is inserted eccentrically in the cavity within the cup, as shown in figs. 1 and 9.

From the front edge of the wheel B, on each inner face or side of the cup, there is formed a ledge or horizontal projection, *l*, as shown in fig. 11, this ledge springing from the side of the cup and increasing in width as it proceeds around underneath the wheel, until, having reached a point just in rear of a line drawn vertically through the center of the wheel, it extends laterally to the center, where it meets the corresponding ledge on the opposite side, from whence they extend around up behind the wheel to the opening G, this ledge *l* being concentric with the wheel, and close against its periphery, as shown in fig. 9. This wide portion of the ledge *l* is also continued above the opening G, to near the rear edge of the mouth or cavity of the cup, as shown in figs. 2, 8, and 10.

It will thus be seen that the cavity within the cup, through which the grain passes from the hopper, is quite large at its top, but gradually contracts, growing both narrower and shallower, until, at a point directly under the center of the wheel, or near that point, it terminates, the wall of the shell there coming in contact with the periphery of the wheel, from which point the cavity for the passage of the grain is confined to the groove in the wheel, between the flanges *a*.

By this construction of the cup or case A and the wheel B the grain is gathered gradually, and without danger of being crushed, into the groove between the flanges *a* of the wheel, and, by the ribs *e* thereon, is fed with the utmost regularity out through the opening G in the rear end of the cup.

In the upper rear portion of the cup A, in front of the opening G, I form a mortise or recess, inclining downward and forward, in which is inserted a gate or tongue, *b*, the lower end of which fits between the flanges *a* of the feed-wheel, with its lower end just clearing the bottom of the groove in the wheel, as shown in fig. 1, the object of this gate being to prevent the grain from passing out through the groove on top of the wheel.

In this case the cup is shown with its bottom falling below the periphery of the wheel B, in fig. 1, thus leaving, as it were, a sort of pocket or recess directly under the wheel; but I propose to make this portion of the cup as indicated by the dotted line *d*, thus dispensing with this pocket, and having the wall of the cup approach the periphery of the wheel on a tangential curve, and so avoid having any abrupt shoulder or wall, against which the grain might possibly be jammed or crushed.

By this method of constructing the feed-wheel and its cup or case, I produce an apparatus that performs its function of feeding out the grain in the most perfect manner. As the grain is gathered by the gradual and very gentle inclination or convergence of the walls of the cup within the groove of the wheel, all crushing, grinding, clogging, and "bunching" of the grain are prevented, and, by the ribs on the wheel, it is fed out in a continuous and even stream.

It is obvious that this feeding device may be used either for sowing grain broadcast or in drills, its function and mode of operation being the same in either case.

Having thus described my invention,

What I claim is—

1. In combination with a cup, A, having its interior of a volute form, substantially as described, the feed-wheels B, having a groove around its periphery, substantially as set forth.

2. A feed-wheel, B, consisting of a cylindrical body, having journals, *m*, at each end, with radial flanges, *a*, having ribs, *e*, arranged radially on their inner faces, substantially as described.

3. The seed-cup A, having its opposite sides provided with holes, I, to form bearings for the journals of the feed-wheel or the shaft, and having the gradually-increasing and laterally-projecting ledge *l* formed thereon, concentric with holes I, substantially as herein set forth.

JOHN H. THOMAS.

Witnesses:
GEO. ARTHUR,
PETER MINNICH.